W. C. BEATTIE.
Pickle-Caster.

No. 225,786. Patented Mar. 23, 1880.

WITNESSES:
John F. C. Preinkert
Edw. T. V. Byrn

INVENTOR:
Wm. C. Beattie
BY
ATTORNEYS.

UNITED STATES PATENT OFFICE.

WILLIAM C. BEATTIE, OF TAUNTON, MASSACHUSETTS, ASSIGNOR TO REED & BARTON, OF SAME PLACE.

PICKLE-CASTER.

SPECIFICATION forming part of Letters Patent No. 225,786, dated March 23, 1880.

Application filed February 11, 1880.

*To all whom it may concern:*

Be it known that I, WM. C. BEATTIE, of Taunton, in the county of Bristol and State of Massachusetts, have invented a new and Improved Pickle-Caster; and I do hereby declare that the following is a full, clear, and exact description of the same, reference being had to the accompanying drawings, forming part of this specification, in which—

Figure 1:
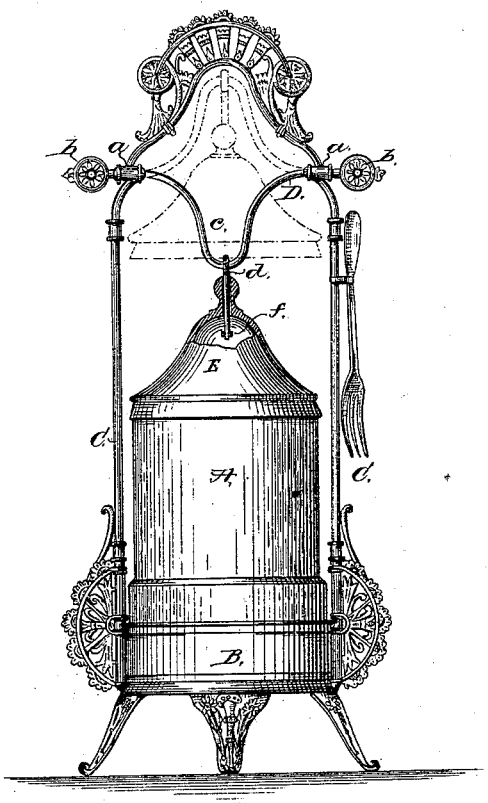
Figure 2:
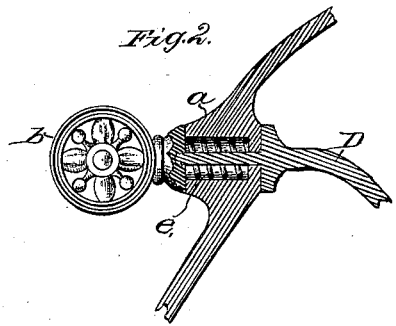

Figure 1 is a side elevation, with the elevated position of the cover shown in dotted lines. Fig. 2 is a sectional view of the tension-spring at the joint or bearing of the crank-shaft.

My invention relates to an improvement in pickle-casters, butter-dishes, jewel-cases, sugar-dishes, and other analogous covered dishes, which improvement is designed to raise the cover of said articles and maintain the same in an elevated position.

The invention consists, first, in combining the cover of the vessel with a horizontal crank-shaft journaled in bearings in the side standards or handle, and having knobs or thumb-pieces for turning the same, and a suspending connection with the cover, whereby a rotation of the crank-shaft is made to lift the cover; secondly, in arranging about the bearings of the horizontal shaft a spring, which, by a constant friction or tension, maintains the crank-shaft in any of its positions; thirdly, in connecting the cover of the vessel with the crank-shaft by a sliding rod or its equivalent, as hereinafter described, so as to adapt the devices to the different lengths of pickle-jars, as hereinafter described.

In the drawings, A represents the glass pickle-jar; B, the ornamental metal stand, from which there rise two standards, C C, which connect above the pickle-jar to form a handle. In bearings *a a* in the upper portion of these side standards is journaled a horizontal crank-shaft, D, which, outside of its bearings, is provided with knobs or thumb-pieces *b b*, by which the shaft is turned. The bent or cranked portion *c* of this shaft D is connected, by a loose rod, *d*, with the cover E of the pickle-jar, so that when the said shaft is turned the cover is lifted from the jar, as shown in dotted lines.

In order to sustain the cover in any position to which it may be lifted, a spring, *e*, (shown in detail in Fig. 2,) is arranged in one or both of the bearings *a* of the rock-shaft, so as to preserve a constant tension or friction of sufficient strength to maintain the cover in said elevated position.

In order to adapt the given throw of the crank of the shaft D to different lengths of pickle-jar and still preserve the vertically-pendent position of the crank when the cover is on the jar, the rod *d* is extended through the cover E with a loose sliding connection, and has a ball nut or head, *f*, at its lower end, which, when the crank rises, strikes against the cover and lifts the same. If the jar be taller, the crank, in being restored to its pendent position, forces the rod through the cover, so that the ball or head passes down into the hollow of the cover.

I do not confine myself to this exact construction for reaching this result, as the same result may be attained by a chain, an elongated eye or link, or other loose connection.

I am aware that it is not broadly new to provide the cover with devices for raising and maintaining it in elevated position over the vessel, and I therefore do not claim this, broadly; but,

Having thus described my invention, what I claim as new is—

1. In a covered dish, the combination, with the cover and side standards rising above the same, of a horizontal crank-shaft journaled in said side standards and having a loose connection with the cover, substantially as and for the purpose described.

2. The combination, with the cover, the side standards having bearings, and the horizontal crank-shaft loosely connected with the cover, of a spring arranged in one or both of said bearings and adapted to maintain the cover in elevated position, as described.

3. The combination, with the horizontal crank-shaft D and the cover E, of a loose rod, *d*, sliding through the cover and having a head nut or ball on its lower end, as described.

WILLIAM CHALLEN BEATTIE.

Witnesses:
THEO. P. HALE,
F. E. FISKE.